J. A. & H. A. HOUSE.
SEWING MACHINE.
No. 39,444. Patented Aug. 4, 1863.
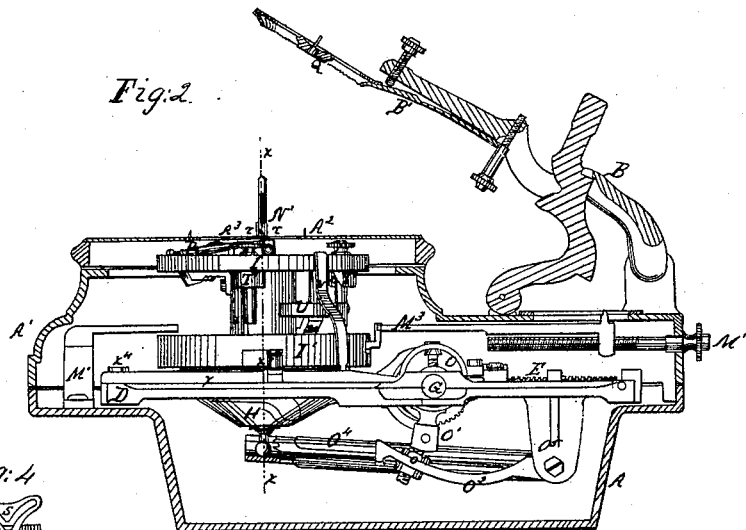
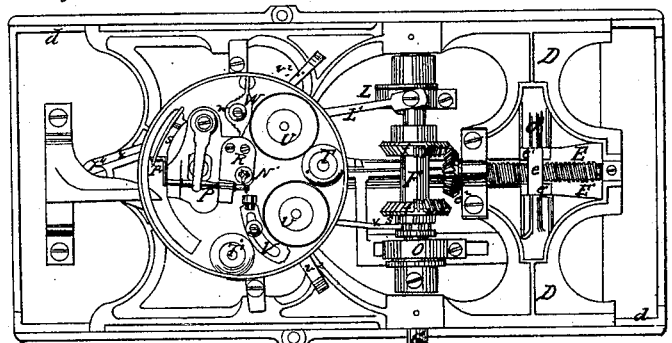
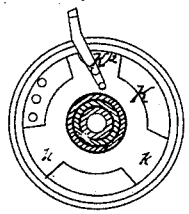
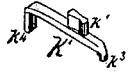
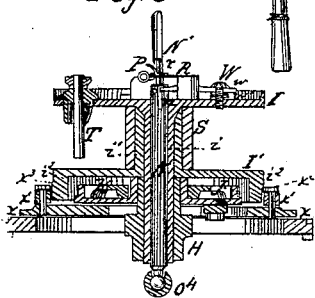
Witnesses. Inventors.

UNITED STATES PATENT OFFICE.

JAMES A. HOUSE AND HENRY A. HOUSE, OF BROOKLYN, ASSIGNORS TO THEMSELVES AND AUGUSTUS G. SEAMAN, OF NEW YORK, N. Y.

IMPROVEMENT IN SEWING-MACHINES.

Specification forming part of Letters Patent No. 39,444, dated August 4, 1863.

*To all whom it may concern:*

Be it known that we, JAMES A. HOUSE and HENRY A. HOUSE, both of Brooklyn, in the county of Kings and State of New York, have invented certain new and useful Improvements in Sewing-Machines, of which the following is a full, clear, and exact description, reference being had to the accompanying drawings, which make part of this specification, and in which—

Figure 1 represents a plan or top view of a machine for working button-holes embracing our improvements, with its upper casing removed; Fig. 2, a view in elevation of one side of the same, the casing and a portion of the mechanism being shown in section, and the presser-lever raised, in order to permit the removal or adjustment of the work. Fig. 3 represents a vertical transverse section through the same at the line $x$ $x$ of Fig. 1. Fig. 4 represents a detached view of the cam and collar by which motion is communicated from the needle-mandrel to the curved finger. Fig. 5 represents a view partly in plan and partly in section, showing the details of the frog and gripping-lever by which the stitching mechanism is rotated at proper intervals; and Fig. 6 represents a view in perspective of the gripping-lever detached and inverted.

The improvements claimed under this patent consist, first, in arranging the tension apparatus of both needles underneath the bed-plate or table of a sewing-machine, whereby a clear space is left above for the operator; secondly, in combining a frog and a gripping lever with the rotary disk or frame, upon which the stitching mechanism is mounted in such manner as to rotate the disk at the proper moment to work around the eye of a button-hole or to commence a new one; thirdly, in combining an eccentric and an adjustable arm with the needle-mandrel for the purpose of graduating the length of its stroke, and consequently the length of stitch; fourthly, in driving the looper or thread-carrier by means of a cam mounted on a collar connected with the needle-mandrel in such manner that the movements of the needle and thread carrier shall be isochronous; fifthly, in mounting the tension-posts loosely in the disk which carries the stitching mechanism, instead of connecting them permanently thereto, as heretofore, whereby we are enabled adjust the tension more readily.

The accompanying drawings exemplify one mode of carrying out the objects of our invention. A bed-plate, $A^2$, is secured upon the upper portion, A', of the frame or casing, and covers an opening in it, in which the stitching mechanism works, the needle playing through a long slot, $A^3$, in the bed-plate. A suitable clamping device, B, is also mounted upon the casing. In this instance the stitching mechanism and gearing are shown as mounted in a stout frame, D, which slides on ways $d$ on the casing A. The gearing-frame D is traversed back and forth at suitable intervals by means of a screw, E, mounted on one end thereof and working through a nut, $e$, having a female screw cut in it. This nut fits accurately edgewise between vertical standards $e'$ on a bracket, E', projecting from the casing, by which arrangement the mechanism and gearing can (when the upper casing, A'', is removed) be taken out from the frame by simply lifting the nut out of its bearings, while it is held perfectly secure while in operation. The traversing screw is rotated by means of its bevel-pinion $e^2$, which engages alternately with two bevel half-gears, $f$ $f'$, on a sliding collar, F, which moves freely on the driving-shaft G, which is mounted in the traversing frame D, a slot in the casing permitting it to travel with the frame.

The main bearing for the stitching mechanism consists of a cylinder, H, forming part of the traversing frame D. The spindle or collar $i$ of the upper disk, I, is hollow, and passes down through the cylinder H. The lower disk, I', is likewise provided with a similar spindle, $i'$, which incloses that of the upper one. The bottom of this disk bears upon the top of the cylinder H, and has a downward projecting rim or flange, $i^2$, forming a cavity, in which is placed a ring, J, having a flange on both its outer and inner edges. A frog, K, lies inside this disk. It consists of a ring having projections $k$ on its periphery. Fig. 5 shows a plan view of this frog, which fits accurately but turns freely in the flanged rim J. A gripping-lever, K', of the form shown in Fig. 6 has upon it a key, $k'$, which fits into a notch, $K^2$, on the frog, as shown in Fig. 5. The nose $k^3$ of this lever fits into a slot in the lower disk, I', while its tail $k^4$ projects through a slot in the edge of the same disk. This device is an improvement on the pawl-and-ratchet arrangement for turning the disk described in a patent heretofore granted to us, and has proved of great practical value, for we found by experience that the ratchet-teeth were soon worn off by the constant abrasion to which they were subjected, whereas in the present case the turning of the disk is effected by frictional contact, for it will be seen by reference to the drawings that the lever locks the frog and disk together while moving in one direction, but leaves them entirely disconnected when moving in the other. The rotating movement of the ring J around its axis is produced by an eccentric, L, on the driving-shaft G, which actuates a pusher, L', pivoted to the ring, as shown in Figs. 1, 2, and 3.

The needle-mandrel N is driven by an eccentric, O, on the driving-shaft G, which actuates an adjustable arm or connecting-link, O'. This link is attached to a slotted arm, $O^2$, by means of a nut and set-screws, $o$, in order to vary the length of stroke of the needle-mandrel. This slotted arm is connected to a rock-shaft, $O^3$, pivoted to a bracket, $O^5$, underneath the frame D. The needle-mandrel is driven from the pitman $O^4$ on this rock-shaft, as shown in Figs. 1 and 2.

The needle bar or shank N', which is mounted on the mandrel, is made with a projection on its upper end, in which the needle is inserted, and a groove or slot is made in it for the thread-carrier P to work in. Both the needle and thread carrier play through a slot in the stitching-plate R, which is made sufficiently firm not to yield or spring under the pressure of stitching.

Two small standards, $r$, are erected upon the stitching-plate. They serve both as guides to steady the needle-bar (which plays between them) and to maintain in its proper relation the button Q through a hole, in which the needle-bar also plays. This button plays freely in a slot in the presser-foot B', in order to conform to the traversing and turning movements of the stitching mechanism, and is provided with a small handle or tail, $q$, by which the operator may readily adjust it. A small hole is made through the button for the passage of a gimp or cord.

The curved finger or thread-carrier $p$ is mounted in suitable bearings on the disk. Its shaft P is rocked by means of a bent arm or crank, $p'$, on it, which plays in a heart-shaped cam, $s$, mounted on an arm projecting from an oscillating collar, S, which encircles the spindles of the disk, as shown in Fig. 3. A view of the collar, arm, and cam detached is given in Fig. 4. The collar S is connected with the needle-mandrel by means of a pin or screw, which is inserted into the mandrel and plays freely up and down in a curved slot, S', in the collar, being provided with friction rings or roller, that it may run easily. By this means the vertical movements of the needle-mandrel communicate the requisite movements to the looper or thread-carrier, the movements of which are thus rendered isochronous with those of the needle.

The tension-posts T, instead of being secured to the frame as heretofore, are made to fit tightly, but are so arranged that they can readily be removed when required, which arrangement affords great facilities for adjusting them.

The spool-cases U are mounted on a bar, $u$, one end of which only is fastened to the disk. The bar is then bent up, and again bent so that the portion on which the spool-cases are mounted is above but parallel to the disk. The object of this arrangement is to permit the guides M M' to pass over the disk, which they could not do were the spool-cases mounted directly upon the lower disk. The pearl-guide V has an eye in it through which the thread of the looper passes. It is adjusted by means of a curved slot and set-screw, so as to vary its position relative to the looper, and thus to vary the position of the pearl on the button-hole by varying the angle at which the loop is tightened, as will be readily understood by a mechanic. An adjustable thread-guide, W, is also arranged upon this disk. This tension consists of a lever the outer end of which is pivoted to the disk, so as to play vertically in its bearings. It is prevented from rising above a certain point by a set-screw, $w$, and is held up against the screw by a spiral spring, $w'$. By this device we are enabled to locate the tension apparatus of both needles beneath the table instead of having at least one of them above it, as in all previous machines of which we have any knowledge, which arrangement is a great convenience to the operator, as it leaves the table entirely unobstructed when the presser-foot is raised. The disk is prevented from turning too freely by friction-springs $v^2$, the lower ends of which are inserted into the frame D in such manner as to turn freely in their pivots, that they may be removed out of the way when it is desired to separate the disk from the frame.

The shifting-lever $x$ is arranged and operates in a manner similar to the one described in our former patent. It turns upon a pivot, $x^4$, at one end of the sliding frame D, and is made of a U shape, in order to encompass the cylinder H, upon which the disk is mounted. Upon each of its arms $x$ is mounted a small friction-roller, $x'$, which bears against the edge of the lower disk, I'. There is a small cam or projection, $x^3$, on one side of this disk and a corresponding concavity or depression, $x^2$, on the other, so that when, during the rotation of the disk, the cam $x^3$ strikes one of the friction-rollers the other enters the concavity, and the shifting-lever is moved, and as a prolongation, $x^5$, of one of its arms fits into the sliding collar F the bevel half-gears $f$ are alternately thrown into and out of gear with the traversing screw E.

The operation of the machine is as follows: The arrows show the direction of the movement of the several parts. As the driving-shaft G is rotated the bevel half-gear $f$ imparts an intermittent rotative movement to the screw E, which propels the sliding frame D; upon which the gearing and mechanism are mounted, step by step, the distance between the stitches being determined by the length of this step. The needle-mandrel is vibrated by means of the eccentric O and its connections, as heretofore explained, and a corresponding vibratory movement is imparted to the thread-carrier $b$ through the collar S and heart-shaped cam $s$.

The manner of forming the stitch has been explained in our former patent, and does not require repetition here.

When the stitching mechanism has traversed the distance at which the gage M' has been set, the tail $k^4$ of the gripping-lever slips past the end of the guide M. During this time the flanged ring J has been oscillated round its axis by its cam L and pusher L' without acting upon the disk; but when the gripping-lever is released from the guide it is acted upon by a small spring (not shown in the drawings) in such manner that when moving in one direction it plays loosely, but when moving in the other its key $k'$ locks against the edge of the flanged ring J, and turns the disk a distance equal to the length of stroke of the cam L, which also determines the distance between the stitches. When the disk has performed a semi-rotation the tail $k^4$ of the gripping-lever strikes against the guide M, which throws the gripping-lever out of gear or contact with the flanged ring J. At the same movement one of the friction-rollers $x'$ on the shifting-lever strikes the cam $x^3$ on the disk, while the other drops into its corresponding cavity and moves the shifting-lever sidewise. As one arm, $x^5$, of the lever is connected with the sliding collar F, the other bevel half-gear, $f$, is engaged with the pinion $c$ on the traversing screw E, the motion of which is reversed and the stitching mechanism is caused to traverse back to the point from which it started.

It is obvious that the arrangements of mechanism above described might be varied in many ways without departing from the spirit of our invention.

We deem it unnecessary here to describe in detail the construction of the entire machine, as such details are shown in three several applications for Letters Patent filed simultaneous with this, and respectively marked divisions A, B, and D.

The invention claimed under this patent, though applicable to other machines, is mainly designed as an improvement in a sewing-machine for which Letters Patent of the United States were granted November 11, 1862, to A. G. Seaman and ourselves, (as our assignees,) to which patent reference is made for a complete understanding of our invention in the improvement herein described.

What we claim under this patent as our invention is—

1. Arranging the tension apparatus of both needles or the needle and looper or shuttle of a sewing-machine underneath the bed-plate, substantially in the manner described.

2. The combination of a frog and a gripping-lever, substantially in the manner described, for the purpose of rotating the stitching mechanism when working the eye of a button-hole, as set forth.

3. The combination of the eccentric O and adjustable arm O' with the needle-mandrel, substantially in the manner described, for the purpose of graduating the length of the stroke of the needle-mandrel, as set forth.

4. The combination of the needle-mandrel, the collar S, and the vibrating cam S' with the shaft of the thread-carrier, substantially in the manner described, for the purpose of rendering the movements of the needle and thread carrier isochronous, as set forth.

5. The combination of the loose or removable tension-posts T with the rotating disk, substantially as described.

In testimony whereof we have hereunto subscribed our names.

JAMES A. HOUSE.
HENRY A. HOUSE.

Witnesses:
E. N. HOUSE,
GEO. H. DIMOND.